United States Patent [19]

Angermaier

[11] Patent Number: 5,747,678
[45] Date of Patent: May 5, 1998

[54] METHOD FOR DETECTING CRANKSHAFT OSCILLATIONS

[75] Inventor: Anton Angermaier, Thann, Germany

[73] Assignee: Siemens Aktiengesellschaft, Munich, Germany

[21] Appl. No.: 555,282

[22] Filed: Nov. 8, 1995

[30] Foreign Application Priority Data

Nov. 8, 1994 [EP] European Pat. Off. .............. 94117627

[51] Int. Cl.$^6$ ..................................................... G01N 15/00
[52] U.S. Cl. ................................................................ 73/116
[58] Field of Search .................................. 73/116, 117.3; 123/436; 364/431.08, 431.07

[56] References Cited

U.S. PATENT DOCUMENTS

| | | |
|---|---|---|
| 5,287,737 | 2/1994 | Osawa et al. . |
| 5,311,773 | 5/1994 | Bradshaw et al. .......................... 73/116 |
| 5,357,788 | 10/1994 | Kantschar et al. ...................... 73/117.3 |
| 5,531,108 | 7/1996 | Feldkamp et al. . |

FOREIGN PATENT DOCUMENTS 0 576 705  1/1994  European Pat. Off. .

OTHER PUBLICATIONS

Patent Abstract of Japan No. JP 51–07155 (Osama et al) Aug. 20, 1993.

Primary Examiner—Robert Raevis
Attorney, Agent, or Firm—Herbert L. Lerner; Laurence A. Greenberg

[57] ABSTRACT

A method for detecting oscillations of a crankshaft of an internal combustion engine includes determining if an engine is within a predetermined rpm range. An amplitude of a crankshaft vibration is ascertained if the engine is within the predetermined rpm range. A determination is made as to whether or not the amplitude is greater than a limit value. A frequency of the crankshaft vibration is ascertained if the amplitude is greater than the limit value. A determination is made as to whether or not the frequency is within a predetermined frequency range. An oscillation of the crankshaft is ascertained and a process for detecting combustion misfires by evaluating fluctuations in the crankshaft speed is suppressed for a predeterminable period of time, if the frequency is within the predetermined frequency range.

8 Claims, 1 Drawing Sheet

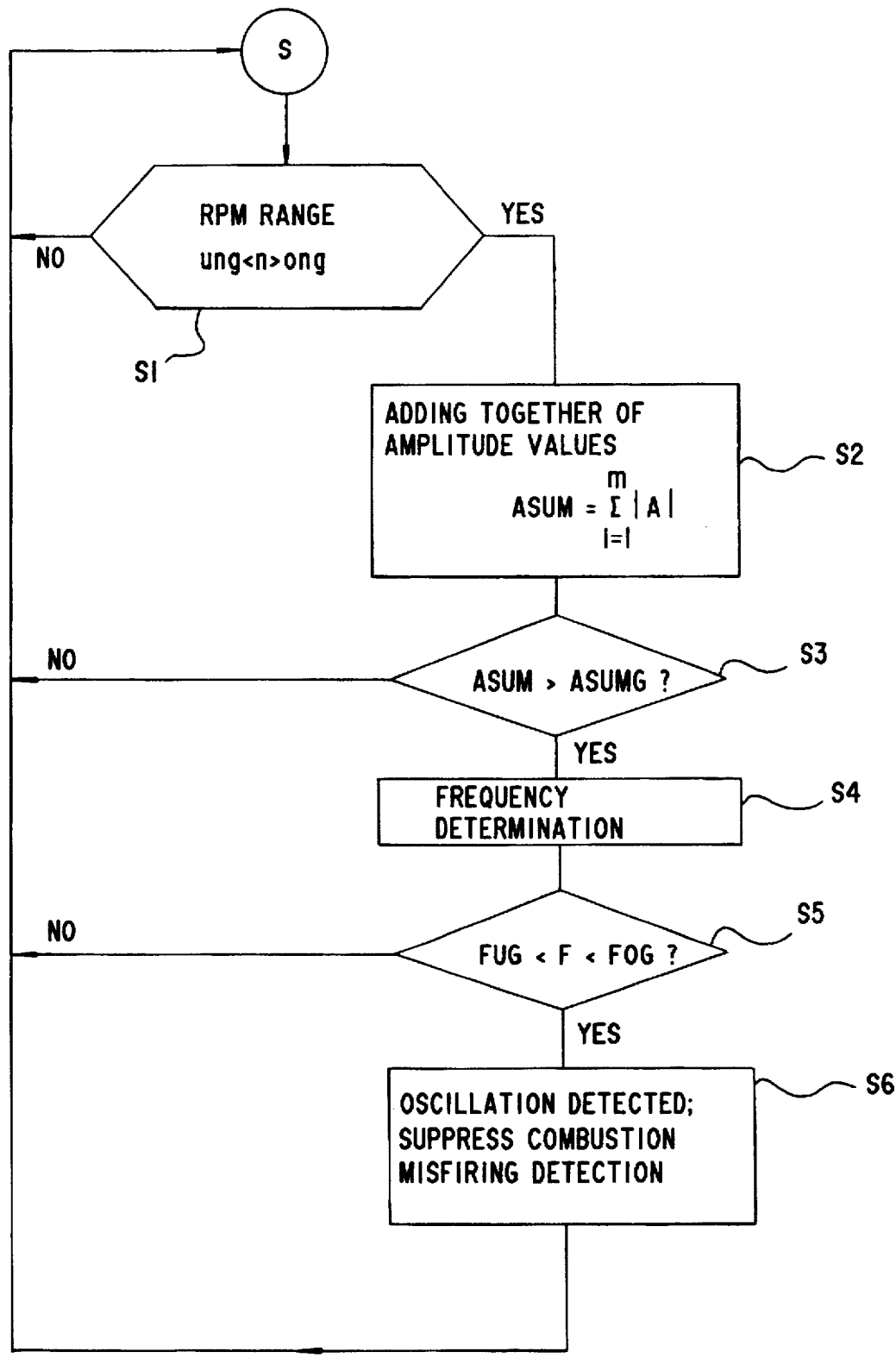

1

METHOD FOR DETECTING CRANKSHAFT OSCILLATIONS

BACKGROUND OF THE INVENTION

SUMMARY OF THE INVENION

The invention relates to a method for detecting crankshaft oscillations.

In an internal combustion engine, especially in the lower rpm range, such oscillations can be caused by combustion misfiring, expulsions of gas, or roughness of the road surface. If such oscillations occur, then typical processes for detecting combustion misfiring, in which changes in the speed of crankshaft revolution are evaluated, are impeded severely, precisely in the lower rpm range, and therefore reliable misfire detection is no longer possible.

SUMMARY OF THE INVENTION

It is accordingly an object of the invention to provide a method for detecting crankshaft oscillations, which overcomes the hereinafore-mentioned disadvantages of the heretofore-known methods of this general type so that combustion misfiring detection is suppressed in ranges in which such oscillations are detected.

With the foregoing and other objects in view there is provided, in accordance with the invention, a method for detecting oscillations of a crankshaft of an internal combustion engine, which comprises determining if an engine is within a predetermined rpm range; ascertaining an amplitude of a crankshaft vibration if the engine is within the predetermined rpm range; determining if the amplitude is greater than a limit value; ascertaining a frequency of the crankshaft vibration if the amplitude is greater than the limit value; determining if the frequency is within a predetermined frequency range; and ascertaining an oscillation of the crankshaft and suppressing for a predeterminable period of time a process for detecting combustion misfires by evaluating fluctuations in the crankshaft speed, if the frequency is within the predetermined frequency range.

The detection of these crankshaft oscillations is carried out through the use of the amplitude and the frequency of the vibrations. In order to define the terms being used, it is noted that: the term crankshaft oscillation means the problematic vibration of the crankshaft from resonance phenomena; and the term crankshaft vibration is used generically to mean both the crankshaft oscillation caused by the resonance phenomena, and the fluctuations in the crankshaft speed caused by combustion misfiring. The fluctuations in the angular speed of the crankshaft caused by the crankshaft oscillation have a substantially greater amplitude than the fluctuations in the angular speed that are caused by combustion misfiring. Moreover, the crankshaft oscillations are located in a very specific frequency band, which differs from the frequencies of the fluctuations in crankshaft speed that are caused by Combustion misfiring. If crankshaft vibrations having this characteristic amplitude and frequency are detected, then it is ascertained that a crankshaft oscillation is occurring, rather than an irregularity in the crankshaft speed that is due to combustion misfiring. In such a case, the detection of misfiring is suppressed for a certain period of time. After that a new check is made as to whether or not crankshaft oscillations are still occurring. If no further crankshaft oscillations are found, then the misfiring detection is allowed to resume.

In accordance with another mode of the invention, there is provided a method which comprises ascertaining the amplitude of the crankshaft vibration by adding together amounts of only positive or only negative amplitudes over a predeterminable measurement period to provide a total amplitude value, and comparing the total amplitude value with a total amplitude limit value.

In accordance with a further mode of the invention, there is provided a method which comprises obtaining the total amplitude limit value by multiplying the limit value for the vibration amplitudes by a factor being greater than one, and indicating a combustion misfire in the process for detecting combustion misfiring if the limit value is exceeded.

In accordance with an added mode of the invention, there is provided a method which comprises ascertaining the frequency of the crankshaft vibration by ascertaining a number of reversal points of a course of the amplitude of the vibration over a predetermined measurement period, and then calculating the frequency from this number and from a duration of the measurement period.

In accordance with an additional mode of the invention, there is provided a method which comprises ascertaining a spacing between two reversal points of an amplitude course of the vibration for ascertaining the frequency.

In accordance with a concomitant mode of the invention, there is provided a method which comprises setting the predetermined rpm range between 800 rpm and 1800 rpm.

Other features which are considered as characteristic for the invention are set forth in the appended claims.

Although the invention is illustrated and described herein as embodied in a method for detecting crankshaft oscillations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with accompanying drawing.

BRIEF DESCRIPTION OF THE DRAWING

The FIGURE of the drawing is a flow chart which shows the basic course of the method.

DESCRIPTION OF THE PREFERRED EMBODIMENTS

Referring now to the single FIGURE of the drawing in detail, there is seen a method step S1, in which a check is made as to whether or not a current engine rpm n is less than a predetermined upper limit rpm ong and greater than a lower predetermined rpm ung. A rotary speed of 800 rpm is chosen as a preferred value for the rpm ung, and a rotary speed of 1800 rpm is chosen as a preferred value for the rpm ong. The rpm range depends on the engine being used. If the current engine rpm is outside this demarcated range, then a return is made to a start S of the method, at which the method for checking for crankshaft oscillations is restarted after a predeterminable period of time.

If the current engine rpm n is within this demarcated range, then in a method step S2 an amplitude of a crankshaft vibration is ascertained. Fluctuations in the crankshaft speed are ascertained by measuring periods of time in which fixed angular ranges of the crankshaft (segments) move past a sensor that responds to segment markings. One such method has been described, for instance, in Published European Patent Application 0 576 705 A1, corresponding to U.S. Pat. No. 5,433,107, which has an inventor in common with the instant application. Since the vibrations of the crankshaft involve a dynamic process that is subject to manifold influencing and interfering factors, what is detected is not merely a single amplitude of the crankshaft vibration for evaluation purposes but rather the amplitudes over a measurement range that includes a plurality of crankshaft segments. To that end, the amounts of either only the positive or only the negative vibration amplitudes A over a predetermined measurement period are added together (ASUM).

In a method step S3, the amplitude total ASUM which is thus formed is then compared with a predetermined limit value ASUMG. If the total ASUM is less than or equal to the limit value ASUMG, then a conclusion that a crankshaft oscillation exists is not drawn, and a return is made to the method start S. However, if the total amplitude ASUM is greater than the total amplitude limit value ASUMG, then this is evaluated as a first indication of the presence of crankshaft oscillations, and the method proceeds to a step S4. A multiple of the engine roughness limit value is advantageously used as the amplitude limit value. It is used in the aforementioned processes for detecting combustion misfiring, which are based on the principle of engine roughness measurement or in other words the principle of evaluating the fluctuations in the crankshaft speed. The engine roughness limit value is the optionally modified amplitude value of the crankshaft vibration, the exceeding of which indicates a misfire. With the amplitude limit value which is thus calculated, it is guaranteed that a conclusion that oscillation of the crankshaft motion is occurring will be drawn only whenever the amplitudes of the vibration are actually greater than the vibration amplitudes of the kind caused by misfiring.

The frequency of the crankshaft vibration is ascertained in the method step S4. To that end, the number of reversal points of the amplitude (maximum and minimum points) of the vibration are ascertained for monitoring of the vibration amplitude over a measurement region that includes a plurality of crankshaft segments, for instance four crankshaft segments. The frequency can then be ascertained from this number and from the duration of the measurement period.

In a method step S5, a checked is then performed as to whether or not the ascertained frequency is within a certain range, or in other words whether the frequency F is greater than a lower limit value FUG and less than an upper limit value FOG. If the frequency is not within this range, then a return is made back to the start S of the method. However, if the frequency is in the above-defined frequency range, then in a method step S6 the presence of a crankshaft oscillation is ascertained, and the process for combustion misfiring detection is suppressed for a predetermined period of time. A return is subsequently again made to the start S of the method.

Various other methods for ascertaining and checking frequency are also possible. For instance, the spacing between two reversal points of the amplitude can be ascertained, for example from the number of segments that have meanwhile moved past the measurement sensor. This value can then be compared directly with spacing limit values. It would also be conceivable for a counter to be set to a predetermined value each time a reversal point of the vibration amplitude is ascertained, and then next time the individual segments move past the sensor, this counter would then be decremented by one each time, as long as it still had a value greater than zero. A critical frequency that is evidence of crankshaft oscillations is assumed if at the moment of interrogation the counter has a value that is greater than zero. When the next reversal point of the vibration amplitude is reached, the counter is then set upward again to the predetermined value.

I claim:

1. A method for detecting oscillations of a crankshaft of an internal combustion engine, which comprises:

determining if an engine is within a predetermined rpm range;

ascertaining an amplitude of a crankshaft vibration if the engine is within the predetermined rpm range;

determining if the amplitude is greater than a limit value;

ascertaining a frequency of the crankshaft vibration if the amplitude is greater than the limit value;

determining if the frequency is within a predetermined frequency range; and ascertaining an oscillation of the crankshaft and suppressing for a predeterminable period of time a process for detecting combustion misfires by evaluating fluctuations in the crankshaft speed, if the frequency is within the predetermined frequency range.

2. The method according to claim 1, which comprises ascertaining the amplitude of the crankshaft vibration by adding together amounts of only positive amplitudes over a predeterminable measurement period to provide a total amplitude value, and comparing the total amplitude value with a total amplitude limit value.

3. The method according to claim 1, which comprises ascertaining the amplitude of the crankshaft vibration by adding together amounts of only negative amplitudes over a predeterminable measurement period to provide a total amplitude value, and comparing the total amplitude value with a total amplitude limit value.

4. The method according to claim 2, which comprises obtaining the total amplitude limit value by multiplying the limit value for the vibration amplitudes by a factor being greater than one, and indicating a combustion misfire in the process for detecting combustion misfiring if the total limit value is exceeded.

5. The method according to claim 3, which comprises obtaining the total amplitude limit value by multiplying the limit value for the vibration amplitudes by a factor being greater than one, and indicating a combustion misfire in the process for detecting combustion misfiring if the total limit value is exceeded.

6. The method according to claim 1, which comprises ascertaining the frequency of the crankshaft vibration by ascertaining a number of reversal points of a course of the amplitude of the vibration over a predetermined measurement period, and then calculating the frequency from this number and from a duration of the measurement period.

7. The method according to claim 1, which comprises ascertaining a spacing between two reversal points of an amplitude course of the vibration for ascertaining the frequency.

8. The method according to claim 1, which comprises setting the predetermined rpm range between 800 rpm and 1800 rpm.

* * * * *